United States Patent [19]

Stemme et al.

[11] Patent Number: 4,652,929

[45] Date of Patent: Mar. 24, 1987

[54] METHOD OF AND APPARATUS FOR MAKING VIDEO IMAGES

[75] Inventors: Otto Stemme, Munich; Eduard Wagensonner, Aschheim, both of Fed. Rep. of Germany

[73] Assignee: AGFA-Gevaert AG, Leverkusen, Fed. Rep. of Germany

[21] Appl. No.: 786,311

[22] Filed: Oct. 10, 1985

Related U.S. Application Data

[63] Continuation-in-part of Ser. No. 424,992, Sep. 27, 1982, abandoned.

[30] Foreign Application Priority Data

Dec. 16, 1981 [DE] Fed. Rep. of Germany ....... 3149744

[51] Int. Cl.$^4$ ............................................. H04N 3/36
[52] U.S. Cl. ..................................... 358/214; 358/54; 358/211; 358/909; 358/213
[58] Field of Search ................. 358/214, 211, 54, 215, 358/216, 909, 213; 385/20

[56] References Cited

U.S. PATENT DOCUMENTS 4,420,773  12/1983  Toyoda et al. ...................... 358/335
4,489,351  12/1984  D'Alayer de Costomore d'Arc ................................... 358/213
4,503,466   3/1985  Ryan .................................... 358/211

OTHER PUBLICATIONS

"Improving Low Illumination Video", p. 18, NASA Technical Briefs, vol. 4, No. 1, Spring 1979.

Primary Examiner—Robert G. Lev
Attorney, Agent, or Firm—Michael J. Striker

[57] ABSTRACT

A method of producing a video picture of an image comprises the steps of lighting the image at a light level equal to about a predetermined small fraction of the light level necessary to produce picture-element signals of an amplitude sufficient to process. The thus lighted image is then scanned and electrooptically reduced to a succession of sets of analog picture-element signals a predetermined number N of times, the number N being equal to the inverse of the predetermined small fraction. Thus for each portion of the image there is a respective picture-element signal in each succession. The signals of each image portion are then projected onto the same portion of a light-sensitive medium to form a picture of the image thereon. This medium is capable of adding each of the signals of each set to the signals of the other sets corresponding to the same image portion.

5 Claims, 8 Drawing Figures

METHOD OF AND APPARATUS FOR MAKING VIDEO IMAGES

CROSS REFERENCE TO RELATED APPLICATION

This application is a continuation-in-part of copending patent application No. 424,992 filed Sept. 27, 1982 now abandoned.

FIELD OF THE INVENTION

The present invention relates to making video images. More particularly this invention concerns the production of image-bearing prints in low light conditions.

BACKGROUND OF THE INVENTION

A video reproduction of an image, which here is intended to include a two-dimensional picture or an actual three-dimensional object, is typically made by optoelectrically scanning the object with an image orthicon or a more modern charge-coupled device to produce a succession of rows of picture-element signals. Each of these signals contains data in analog form about the brightness of light (the luminance signal) at a respective spot on the image and about the color of the respective spot (the chrominance signal).

Typically these analog signals are recorded as is, or are transferred as is to other devices capable of reforming the image. Such other peripheral device could be a graphics-capable printer, a video monitor, or even a copier device using electrically inscribable paper.

Clearly whenever analog information is used noise becomes a problem. This is particularly true in video imaging where vast amounts of relatively sensitive analog information must be acted on electronically without adding distortion and noise. The slightest disturbance in a single one of the picture-element signals, and there are upward of $200 \cdot 10^3$ such signals for a reasonably detailed picture, results in an obvious flaw in the resultant reproduction.

Another problem with the prior-art systems is that they work very poorly in low-light conditions, particularly when applied to printing an image. Under such conditions it is usual for the noise, which effectively makes the picture fuzzier, to be even greater, as the amplitude of the random noise signals remains the same while that of the analog picture signal decreases.

OBJECTS OF THE INVENTION

It is therefore an object of the present invention to provide an improved method of and apparatus for making a video image.

Another object is the provision of such a method of and apparatus for making a video image which overcome the above-given disadvantages.

A further object is, by video-imaging means, to produce a detailed reproduction of a still image, which as mentioned above is intended to include an object whose picture is being taken.

Yet another object is to provide a video-imaging system which allows prints, that is hard copies, to be produced even under very low-light conditions.

SUMMARY OF THE INVENTION

A method of producing a video picture of an image according to this invention comprises the steps of lighting the image at a light level equal to about a predetermined small fraction of the light level necessary to produce picture-element signals of an amplitude sufficient to process. The thus lighted image is then scanned and electrooptically reduced to a succession of sets of analog picture-element signals a predetermined number N of times, the number N being equal to the inverse of the predetermined small fraction. Thus for each portion of the image there is a respective picture-element signal in each succession. The signals of each image portion are then projected onto the same portion of a light-sensitive medium to form a picture of the image thereon. This medium is capable of adding each of the signals of each set to the signals of the other sets corresponding to the same image portion.

Thus according to this invention the optoelectric device scans the image being reproduced N times, N being a number normally between 10 and 100 and being generally proportional to the amount of noise as well as the desired degree of noise suppression. This predetermined number of picture-element signals for a respective spot on the image are all added together to form a so-called sum signal having an amplitude equal to about N times the amplitude of each individual picture signal making it up. Since the noise part of each picture-element signal is uncorrelated and changes from one picture signal to the next in the same series, this part of the signal will be attenuated relative to the repetitive nonnoise part of the signal, which will be the same each time the particular image spot is scanned. As a result this correlated nonnoise phase of the signal is amplified N times. The uncorrelated noise phase of the signals is, however, only increased by a factor of $N^{\frac{1}{2}}$, by the square root of N, so that it is effectively attenuated.

The apparatus according to this invention therefore comprises means for scanning the image and electrooptically reducing it to a succession of sets of analog picture-element signals a predetermined number N of times so that for each portion of the image there is a respective picture-element signal in each succession. Means is also provided for lighting the image at a light level equal to about 1/N times the light level necessary to produce picture-element signals of an amplitude sufficient to process. A light-sensitive medium capable of adding each of the signals of each set to the signals of the other sets corresponding to the same image portion acts as the target onto which the signals are projected to add them up and form a picture of the image with each picture-element signal being projected onto the medium in the same location as the other signals of the same image portion.

According to another feature of this invention each sum signal is divided by N before it is processed. In this manner the sum-signal amplitudes are reduced to usable levels.

It is also possible according to this invention to light the image only at a light level equal to about 1/N times the light level necessary to produce picture-element signals of an amplitude sufficient to process. In this manner the sum picture signals will have just the right amplitude for processing, each being formed by, in camera terms, N number of exposures each underexposed by this factor of N. In addition the use of powerful lamps, typically of expensive projection grade, can be dropped. In fact the number of repetitions of the scan can in fact be dependent on the amount of light needed to produce the picture, if available light is needed. Either way the need to provide heavy-duty bright lighting for the image is eliminated.

The apparatus according to this invention can have a charge-coupled device (hereinafter CCD) forming the electroptical transducer that reduces the image to rows of analog picture-element signals. Such a device can produce a row at a time of the signals, each row corresponding to a single line of the image.

The reforming means can be a simple high-resolution monitor. It may also include means for projecting signals derived from the sums onto a light-sensitive medium. It would also be possible to digitalize these signals and record them as described in commonly owned and copending application filed by O. Stemme and E. Wagensonner.

DESCRIPTION OF THE DRAWING

The above and other features and advantages will become more readily apparent from the following, it being understood that any feature described with reference to one embodiment of the invention can be used where possible with any other embodiment. In the accompanying drawing.

SPECIFIC DESCRIPTION

Figures 1, 1A:
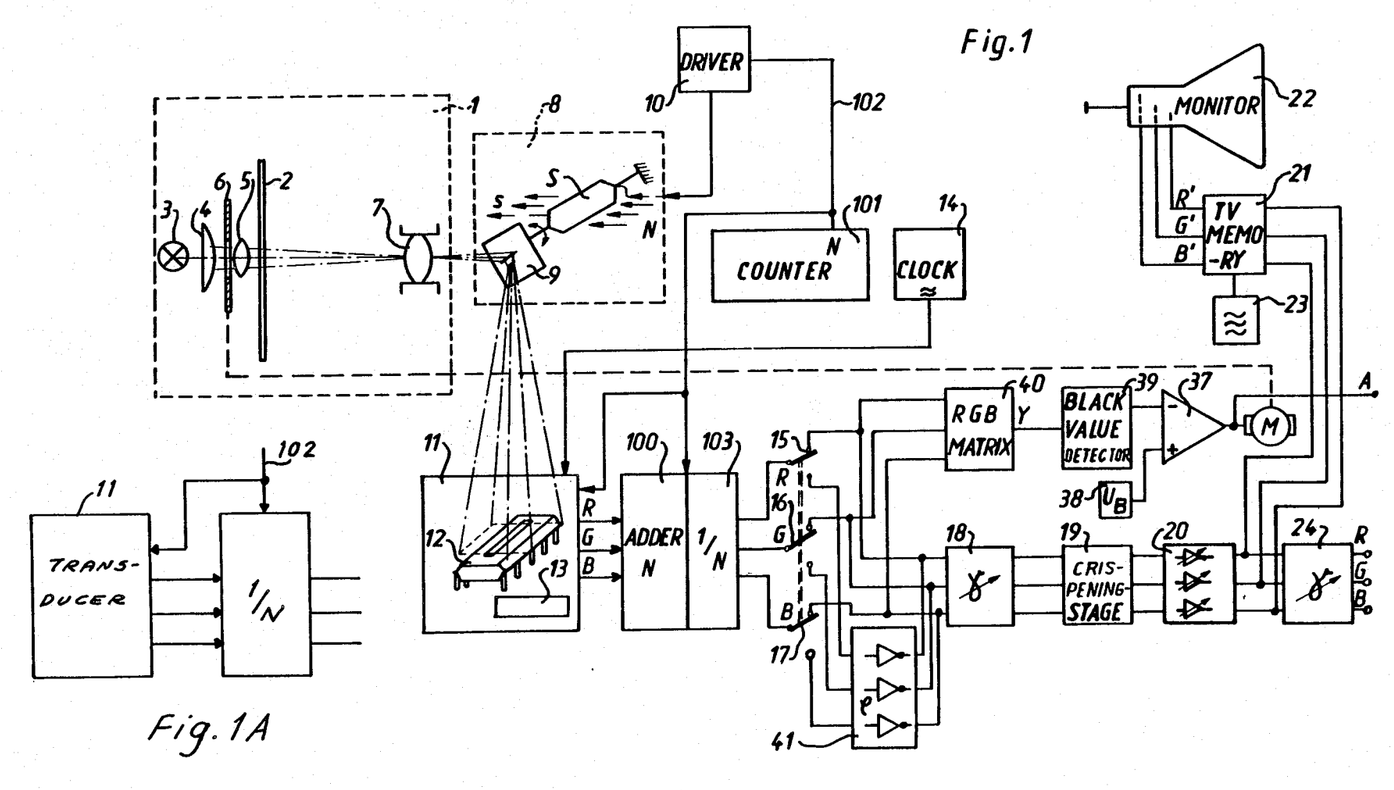
FIGS. 1 and 2 are schematic representations of a system according to this invention.
FIG. 1A is a schematic representation of a detail of a variation on the system of FIG. 1.

As seen in FIGS. 1 and 1A a film-display device 1 has a negative or positive image-bearing master or film strip 2 that can be advanced past a light 3 associated with lenses 4 and 5 and a shutter 6. This master 2 constitutes the image, although it could equally be constituted by a three-dimensional object or opaque picture or painting that was appropriately lighted. The light cast through the master 2 can be substantially lower than that normally needed for taking a fully exposed video exposure, equal to the standard light level divided by a number N equal to at most 100 as will be described in detail below. The image is focused by a lens 7 on the inclined mirror 9 of a tip-mirror device 8 having a mirror drive S. A driver 10 operates the device 8 at, relative to standard television scanning speed, a relatively low rate of about one second per sweep. Thus the line or row reflected by the mirror 9 scans slowly across the image 2.

The image from the mirror 9 is cast onto an optoelectric transducer 11 having a charge-coupled device 12 and a shift register 13. This device 11 produces red, green, and blue outputs R, G, and B in a manner described in somewhat more detail below with reference to FIG. 3. Scanning of the CCD 12 and emptying of the register 13 are controlled by a clock 14. A counter 101 has an output line 102 connected to the driver 10. This counter 101 repeats the scan of the image of the master 2 a total of N times. This number N is set into the counter by the user of the system. As mentioned above it lies normally between 10 and 100, being at the high end if a high amount of noise is present and/or a better signal-to-noise ratio is desired, and vice versa.

As specifically shown in FIG. 1 these three signals R, G, and B are fed to an adding step 100 where they are added together N times, N being the above given number between 10 and 100 and being increased when the noise level is fairly high or when a very high signal-to-noise ratio is required. Obviously as the number N increases the speed of the system decreases, so too high a number is not used. The adding is controlled by the counter 101. After the addition the resultant sums are each divided by N or multiplied by 1/N, which amounts to the same thing. The result is a distinct attenuation of any random noise fed into the adder 100, as the correlated picture signal will be multiplied N times, whereas the random or uncorrelated noise will merely be increased by the square root of N, or $N^{\frac{1}{2}}$.

If the light level from the light source is equal to 1/N times the amount needed to produce a picture-element signal of normal amplitude, it is possible to do away with the stage 103 entirely. In this case the sum signal produced by the stage 100 after N scans will be just right for further processing and reforming into a picture as described below.

The different color-intensity signals R, G, and B are fed through a 3PDT switch 15, 16, 17 to an adjustable gamma corrector 18 and thence through a so-called crispening stage 19 to a set 20 of respective adjustable amplifiers. The corrector 18 acts on the contrast to produced the desired white-black linearity. The stage 19 steepens the flanks of pulses in a limited band width without increasing the band width of the amplifier. In this manner a correcting signal is derived from the input signal and is added to the output signal in such a manner that the flanks of the pulses are made steeper.

As further shown in FIG. 1 the outputs of the amplifiers 20 are fed to a TV memory and operating circuit 21 for a monitor 22. The corrector 18 serves to linearize the gray value for this monitor 22. A control circuit 23 is connected to the memory 21 to process the signals R, G, and B into signals R′, G′, and B′ which can be reformed on the monitor 22 into a reproduction or picture of the image 2. The frequency of the circuit 23 is such that a steady picture is produced on the color monitor 22. In order that the memory 21 does not have to be too big, only every fourth picture signal from the CCD 12 is used. Preferably the CCD 12 has 1700 to 2000 fields per row. Half of these fields are used for the brightness or luminance signal and the other half are split between red and blue. Green is derived from the brightness signal.

Figure 2:
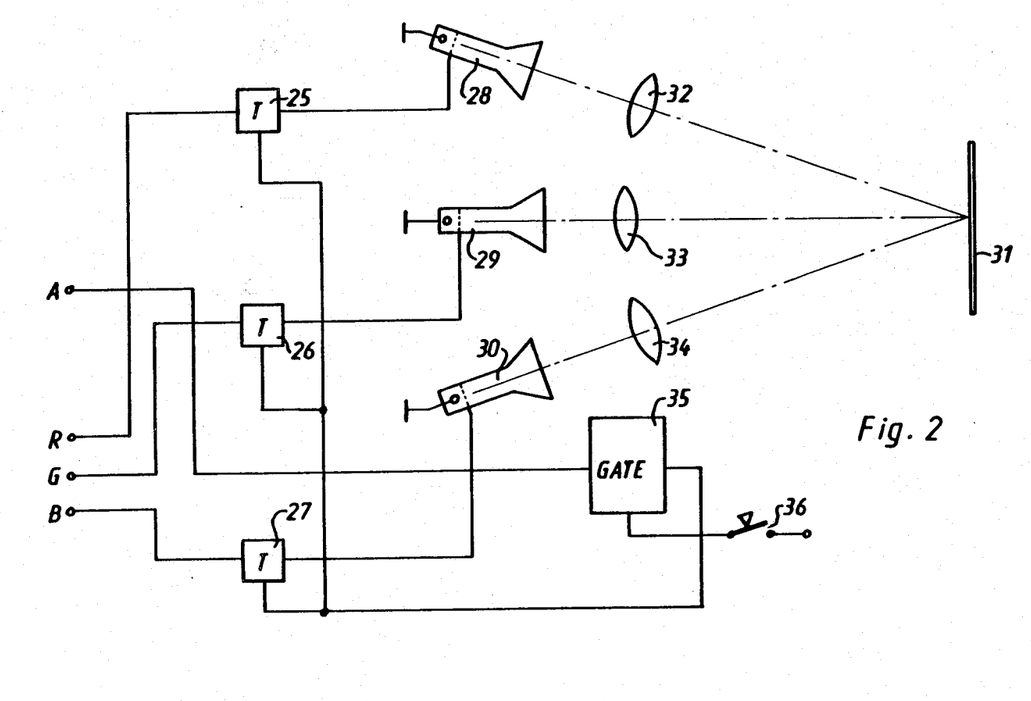

In addition as shown in FIG. 2 the outputs of the amplifiers 20 are connected through another gamma corrector 24, which once again serves for linearizing gray, to the control grids of respective red, green, and blue gates 25, 26, and 27 to respective red, green, and blue projection guns 28, 29, and 30 focussed through respective lenses 32, 33, and 34 on a photographic medium 31, screen, or the like.

It is possible according to this invention as shown in FIG. 1A to eliminate the adder 100 and to project the weak signal onto the medium shown at 31 in FIG. 2 a number of times equal to N. This thereby moves the adding function to the medium, something which is readily achieved with photographic-type media. The result is similar: a digital-quality reproduction with mainly analog means.

As further shown in FIG. 2, the gates 25, 26, and 27 are in turn controlled by a gate 35 that operates when a manually operated switch 36 is closed and when it receives a signal via a connection A from a operational amplifier 37. The red, green, and blue signals from the averager or divider 103 are fed through a red-green-blue matrix 40 whose output Y goes to a black value detector whose output in turn is connected to the minus or inverting input of the amplifier 37. The noninverting or plus input of this amplifier 37 is connected to a source 38 of a fixed voltage. output of the amplifier 37 is fed to a motor M that can move the slide or film 2. The gate 35 therefore serves to transmit the starting pulse from the switch 36 to the projection tubes 28, 29, and 30 when it has sufficient control potential from the amplifier 37.

If the master 2 is a negative rather than a positive, the switches 15–17 are thrown from the illustrated positions to connect a set 41 of three respective inverters into the paths of the three color signals between the stage 103 on the upstream side and the stages 18 and 40 on the downstream side. The result will be perfect inversion of the values and production of a positive image, presuming the machine is set up normally to operate with a positive slide or the like.

Figure 3:
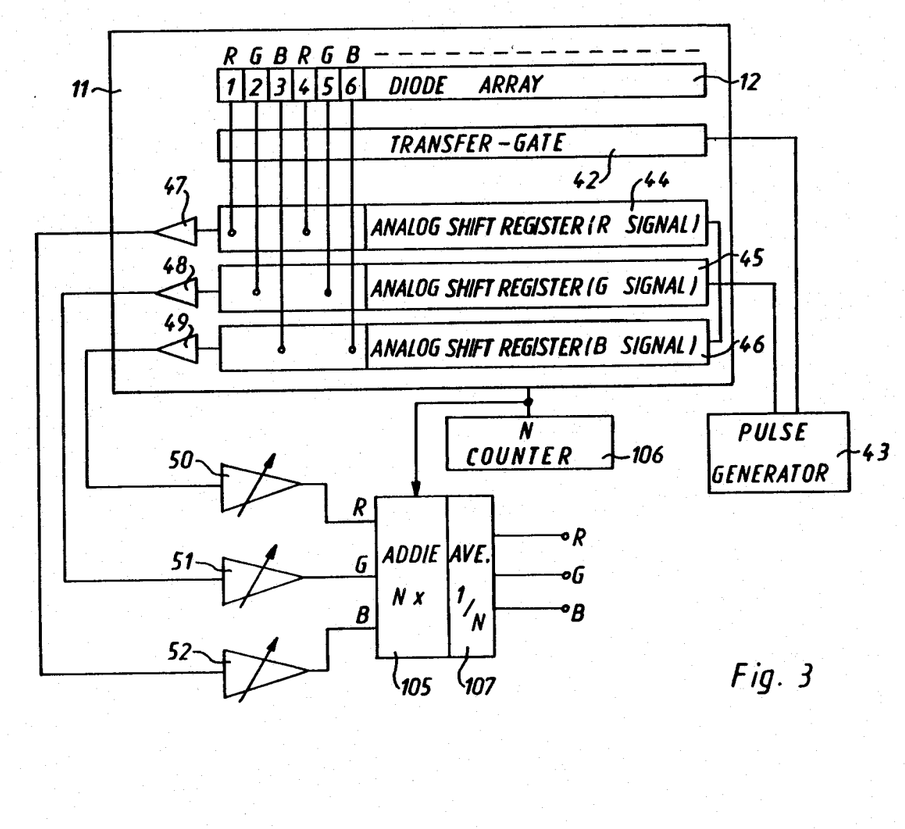
FIG. 3 is a schematic representation of a detail of the system of FIGS. 1 and 2.

FIG. 3 shows an arrangement wherein the CCD device 11 has a diode array 12 whose diodes are arranged as a succession of groups of three, with the first sensitive only to red, the second to green, the third to blue, the fourth to red again, and so on. A transfer gate 42 routes the red signals to an analog shift register 44, the green to a register 45, and the blue to a register 46 as the system is stepped by a pulse generator 43. The registers 44, 45, and 46 deliver their outputs simultaneously through respective amplifiers 47, 48, and 49 to variable input amplifiers 50, 51, and 52 that in turn feed the adder 105 connected to the averager 107. These circuits 105 and 107 are functionally equivalent to the circuits 100 and 103 of FIG. 1.

Figure 4:
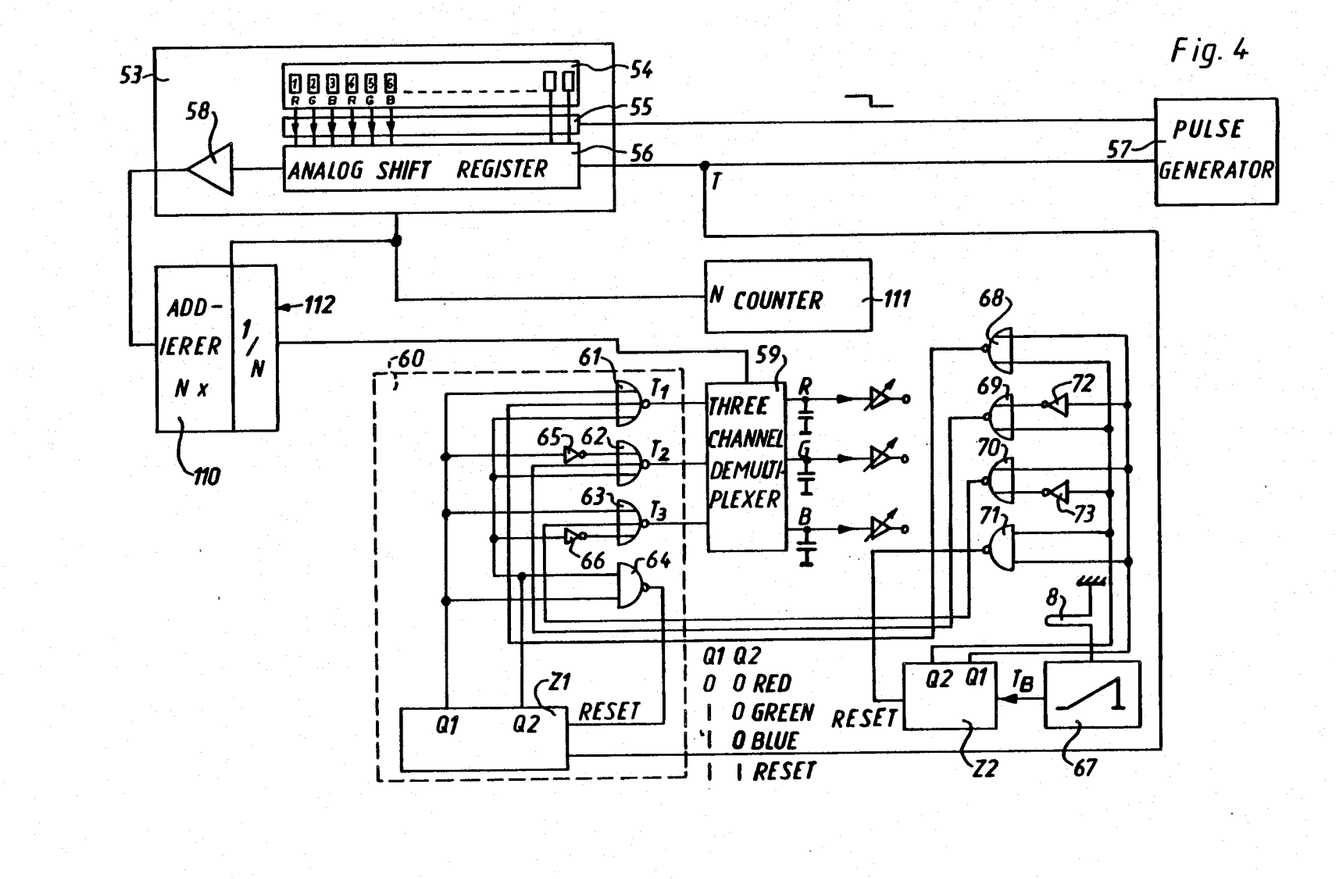
FIG. 4 is another schematic representation like FIG. 1 and showing another system according to this invention.
Figure 5:
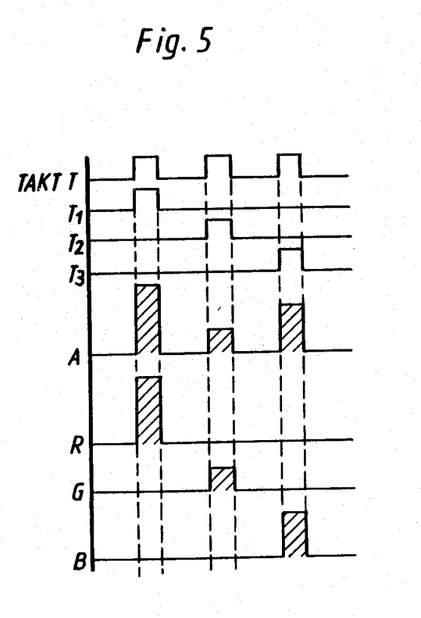
FIGS. 5 and 6 are pulse diagrams illustrating operation of the system of FIG. 4.

The arrangement of FIG. 4 has a CCD transducer 53 provided with at least one CCD strip 54 connected through a transfer gate 55 to an analog shift register, both under the control of a pulse generator 57. Thence the all-color signal A (FIG. 5) goes to an adder 110 and averager 112 controlled with the device 53 from a counter 111, and thence to a three-channel demultiplexer 59 producing the red, green, and blue outputs R, G, and B.

A decoder 60 operates the demultiplexer 59. It has a two-bit digital counter Z1, NOR gates 61, 62, and 63, and a NAND gate 64. The gates 61, 62, and 63 produce outputs T1, T2, and T3 which are illustrated with the pulses T from the generator 57 and the signals R, G, and B in FIG. 5. This counter Z1 is connected to the pulse generator or clock 57 to count synchronously therewith. The Q1 output of the counter Z1 is connected directly with the first input of the NOR gates 61 and 63, via an inverter 65 to the first input of the NOR gate 62, and directly to one of the two inputs of the NAND gate 64. The output Q2 is connected directly to the third inputs of the gates 61 and 62, via an inverter 66 to the third input of the gate 63, and directly to the other input of the NAND gate 64. The counter Z1 is stepped by the pulses T and is reset by the gate 64, which only occurs when both of the outputs Q1 and Q2 are at one. The outputs of the gates 61, 62, and 63 operate the demultiplexer 59 so that the respective outputs R, G, and B are segregated.

Figure 6:
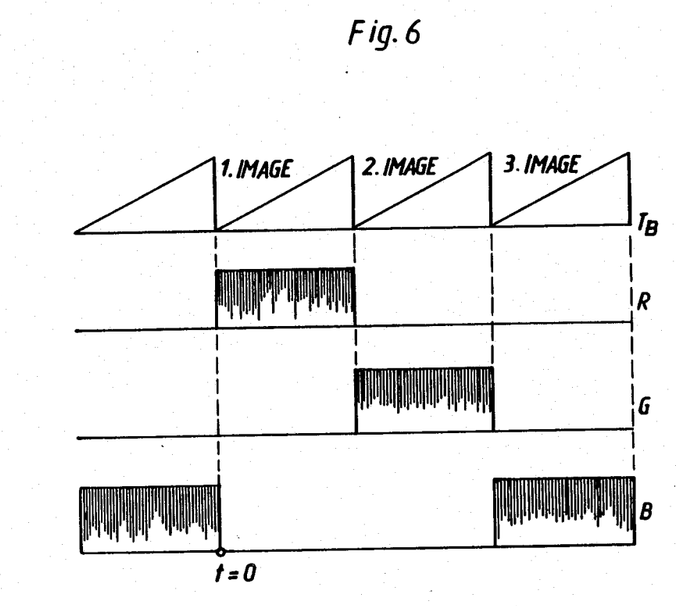

The CCD 54 has 1800 silicon diodes in a row, spaced apart by 13 microns so that it has an overall length of about 24 mm. At time T=0 as seen in FIG. 6 the first line of the picture is read, the transfer gate 66 momentarily transmits and feeds the respective brightness signals from the condenser of the respective photodiode to the analog shift register. These signals are fed out of the register 58 as same is stepped by the generator 57. The frequency of the pulses T is such that with 1800 picture-element signals per line and 1500 lines per frame, the entire screen is read in about 1 sec.

The signal A is for all colors as shown in FIG. 4, but is subdivided into the individual colors by the demultiplexer 59. To this end a second counter Z2 identical to the counter Z1 is employed. It is controlled by a pulse generator or clock 67 that controls the mirror-swing system 8 so that the frequency of the generator 67 is equal to that of the picture. The output Q1 of the counter Z2 is connected directly with the first input of NOR gates 68 and 70, via an inverter 72 to the first input of a NOR gate 69, and directly to one of the two inputs of a NAND gate 71. The output Q2 is connected directly to the second inputs of the gates 68 and 69, via an inverter 73 to the third input of the gate 70, and directly to the other input of the NAND gate 71. The counter Z2 is stepped by the pulses $T_B$ and is reset by the gate 71, which only occurs when both of the outputs Q1 and Q2 are at one. The outputs of the gates 68, 69, and 70 are connected to the second inputs of the gates 61, 62, and 63, respectively.

In this manner as seen in FIG. 6 during the first phase the red signals only, during the second only the green and during the third only the blue signals are passed, and then the three-part cycle is repeated. A synchronously operating system of color filters passing in front of the monitor for this system allow a color picture to be viewed on a black-and-white monitor.

Figure 7:
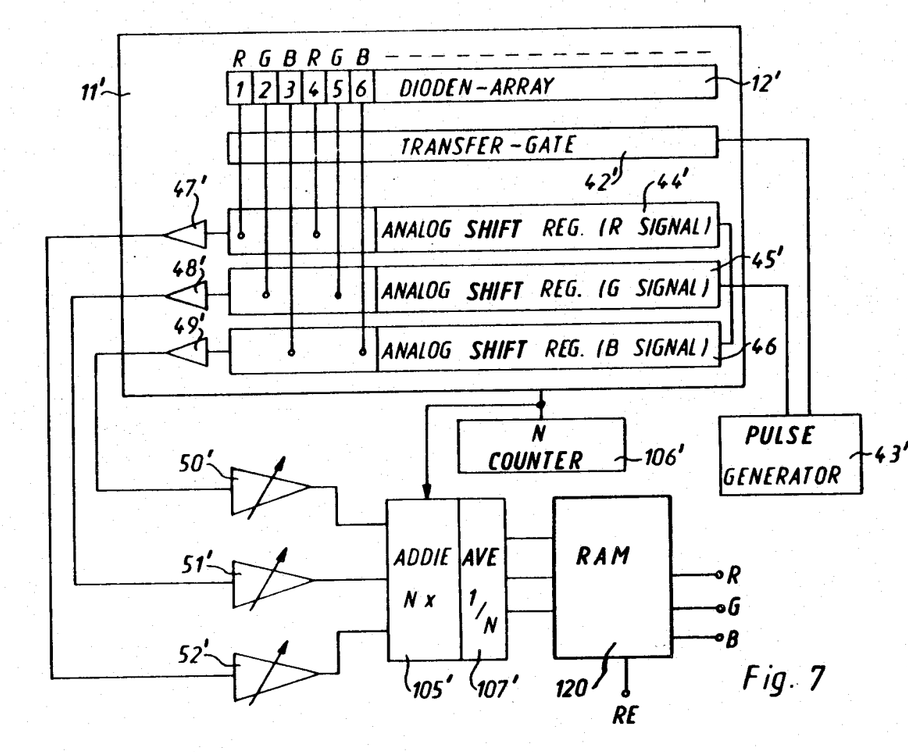
FIG. 7 is a view like FIG. 3 of a variation on a detail of the system of FIG. 4.

In FIG. 7 reference characters identical to those of FIG. 7, but with postscript primes, are employed with identical structure. Here the output of the averager 107' is fed to a random-access memory 120. In this manner the individual frame can be held for replay, imaging, printing, or any other process. The extraordinarily sharp picture can easily be reproduced on photographic film. This memory has shift registers which sequentially give up the individual picture-element signals to the output lines R, G, and B.

With the system of this invention it is possible in a relatively simple circuit to achieve extraordinary picture clarity. Even though the system is mainly analog, it is capable of reducing the noise in an incoming signal to an insignificant level.

I claim:

1. A method of producing a video picture of an image, the method comprising the steps of:
   lighting the image at a light level equal to about a predetermined small fraction of the light level necessary to produce picture-element signals of an amplitude sufficient to process;
   scanning the image and electrooptically reducing it to a succession of sets of analog picture-element signals a predetermined number N of times, the number N being equal to the inverse of the predetermined small fraction, whereby for each portion of the image there is a respective picture-element signal in each succession;
   providing a light-sensitive medium capable of adding each of the signals of each set to the signals of the other sets corresponding to the same image portion; and projecting the signals of each image portion onto the same portion of the light-sensitive medium to form a picture of the image thereon.

2. The video picture-producing method of claim 1 wherein N is between 10 and 100.

3. An apparatus for producing a video picture of an image, the apparatus comprising:

means for scanning the image and electrooptically reducing it to a succession of sets of analog picture-element signals a predetermined number N of times, whereby for each portion of the image there is a respective picture-element signal in each succession;

means for lighting the image at a light level equal to about 1/N times the light level necessary to produce picture-element signals of an amplitude sufficient to process;

a light-sensitive medium capable of adding each of the signals of each set to the signals of the other sets corresponding to the same image portion; and.

4. The video picture-producing apparatus defined in claim 3 wherein the means for electrooptically reducing is a charge-coupled device.

5. The video picture-producing apparatus defined in claim 3 wherein N is equal to between 10 and 100.

* * * * *